(12) United States Patent
Stankovic

(10) Patent No.: US 9,732,794 B2
(45) Date of Patent: Aug. 15, 2017

(54) COLLISION BEARING

(71) Applicant: Mile Stankovic, Darwin River (AU)

(72) Inventor: Mile Stankovic, Darwin River (AU)

( * ) Notice: Subject to any disclaimer, the term of this patent is extended or adjusted under 35 U.S.C. 154(b) by 96 days.

(21) Appl. No.: 14/781,904

(22) PCT Filed: Feb. 24, 2014

(86) PCT No.: PCT/AU2014/000164
§ 371 (c)(1),
(2) Date: Oct. 1, 2015

(87) PCT Pub. No.: WO2014/169316
PCT Pub. Date: Oct. 23, 2014

(65) Prior Publication Data
US 2016/0032965 A1    Feb. 4, 2016

(30) Foreign Application Priority Data

Apr. 18, 2013    (AU) .................. 2013901360

(51) Int. Cl.
*F16C 29/04*    (2006.01)
*F16C 29/00*    (2006.01)
*B60J 7/06*    (2006.01)

(52) U.S. Cl.
CPC .......... *F16C 29/008* (2013.01); *F16C 29/005* (2013.01); *F16C 29/045* (2013.01); *F16C 29/048* (2013.01); *B60J 7/062* (2013.01); *F16C 2326/01* (2013.01); *F16C 2350/00* (2013.01)

(58) Field of Classification Search
CPC .... F16C 29/004; F16C 29/005; F16C 29/008; F16C 29/045; F16C 29/048

USPC .................. 384/19, 50, 53, 55, 58
See application file for complete search history.

(56) References Cited

U.S. PATENT DOCUMENTS

| | | | | | |
|---|---|---|---|---|---|
| 2,383,195 | A | * | 8/1945 | Horman | B23Q 1/40 384/53 |
| 2,880,040 | A | * | 3/1959 | Gomersall | A47B 88/493 312/334.13 |
| 5,026,176 | A | * | 6/1991 | Jensen | A47B 88/493 188/67 |

(Continued)

FOREIGN PATENT DOCUMENTS

| AU | 1987071775 | 10/1987 |
|---|---|---|
| CN | 201217409 Y | 4/2009 |

(Continued)

*Primary Examiner* — Phillip A Johnson
(74) *Attorney, Agent, or Firm* — patenttm.us

(57) ABSTRACT

A Collision Bearing within a channel means, expressing the universal physical principle of collision.
An assembly of two weight-bearing bearings, in two embodiments, for the purpose of moving objects. A slide plate must be attached to the support body of the bearings, whose width is in sliding contact with the inner channel walls, to align the motion of the bearings along the channel. This channel having a flange member, which retains the Collision Bearing within the channel. These two functions, rolling and sliding, simultaneously, demonstrates the universal physical principle of collision being claimed, and places the Collision Bearing in the category of a basic machine in the field of mechanics, as is for example, the nut and bolt.
Impact pads are attached to the end walls of the bearing support body as a necessary component part in protecting this body.

17 Claims, 11 Drawing Sheets

(56) References Cited

U.S. PATENT DOCUMENTS

| | | | |
|---|---|---|---|
| 5,080,422 A | 1/1992 | DeMonte et al. | |
| 5,338,084 A | 8/1994 | Wardell | |
| 5,546,972 A | 8/1996 | Wardell et al. | |
| 5,924,759 A | 7/1999 | DeMonte et al. | |
| 6,065,796 A | 5/2000 | Verduyn | |
| 6,435,595 B1 | 8/2002 | Chenowth | |
| 6,561,564 B1 | 5/2003 | Fliege et al. | |
| 6,599,017 B2 * | 7/2003 | Geelhoed | A61B 6/4441 384/58 |
| 6,648,508 B1 * | 11/2003 | Brunk | F16C 29/008 384/48 |
| 2009/0127348 A1 * | 5/2009 | Schroeder | F16C 29/045 238/148 |
| 2010/0096874 A1 | 4/2010 | LeBlanc et al. | |

FOREIGN PATENT DOCUMENTS

| | | |
|---|---|---|
| DE | 4424655 A1 | 1/1996 |
| DE | 29821546 U1 | 4/2000 |
| DE | 20022003 U1 | 5/2001 |
| DE | 10005986 A1 | 8/2001 |
| DE | 202008007930 U1 | 12/2009 |
| EP | 1116635 A1 | 7/2001 |
| EP | 1120324 A2 | 8/2001 |
| EP | 2371595 B1 | 11/2013 |
| FR | 2236390 A5 | 1/1975 |
| GB | 2199549 A | 7/1988 |
| WO | 2008-000874 A1 | 1/2008 |
| WO | 2009-003218 A1 | 1/2009 |

* cited by examiner

FIGURE 1.1
Case 1
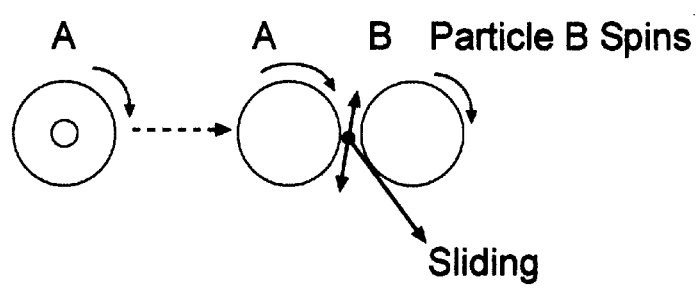
Case 2
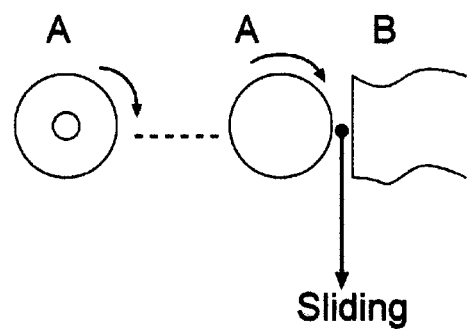

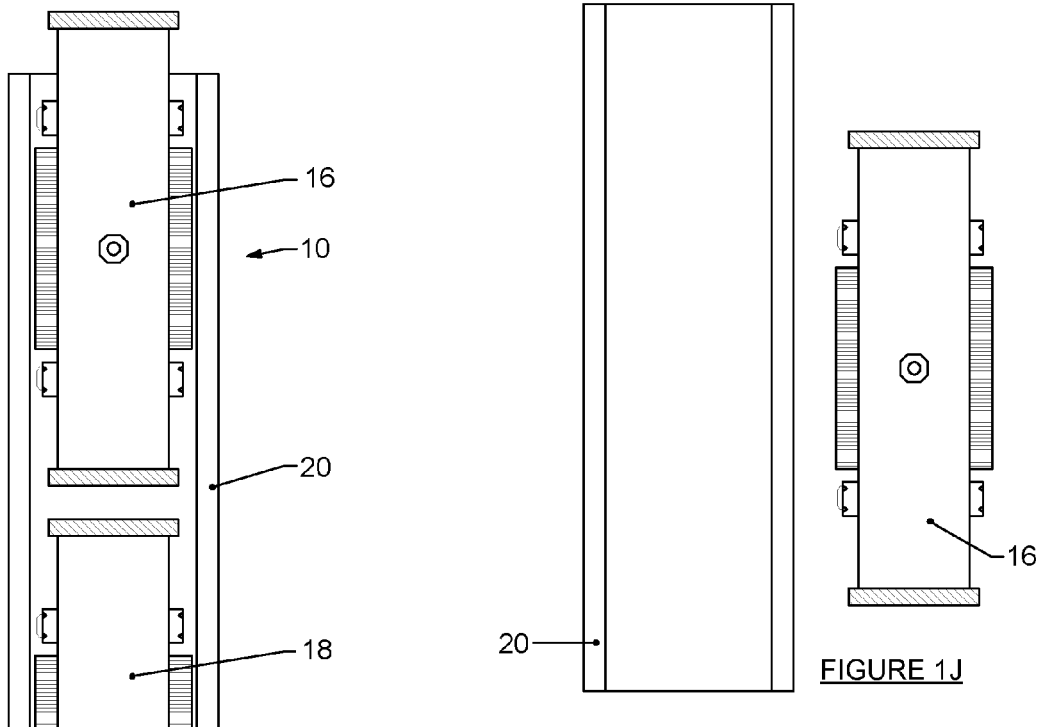
FIGURE 1i
FIGURE 1J
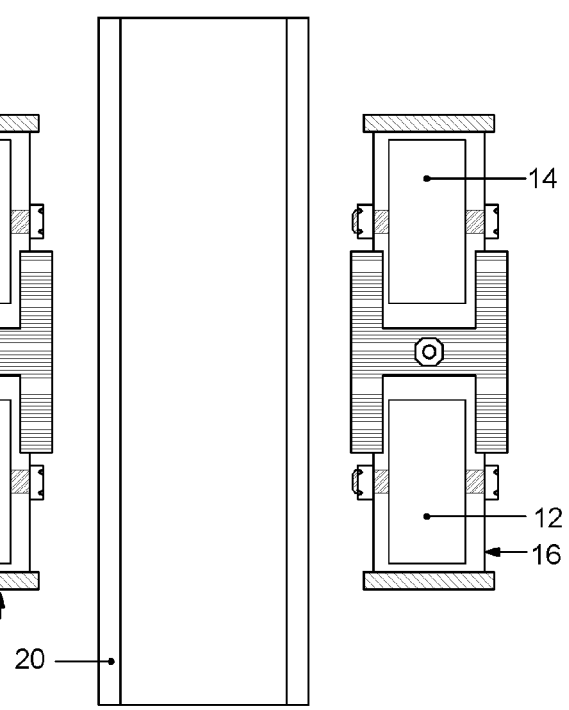
FIGURE 1K

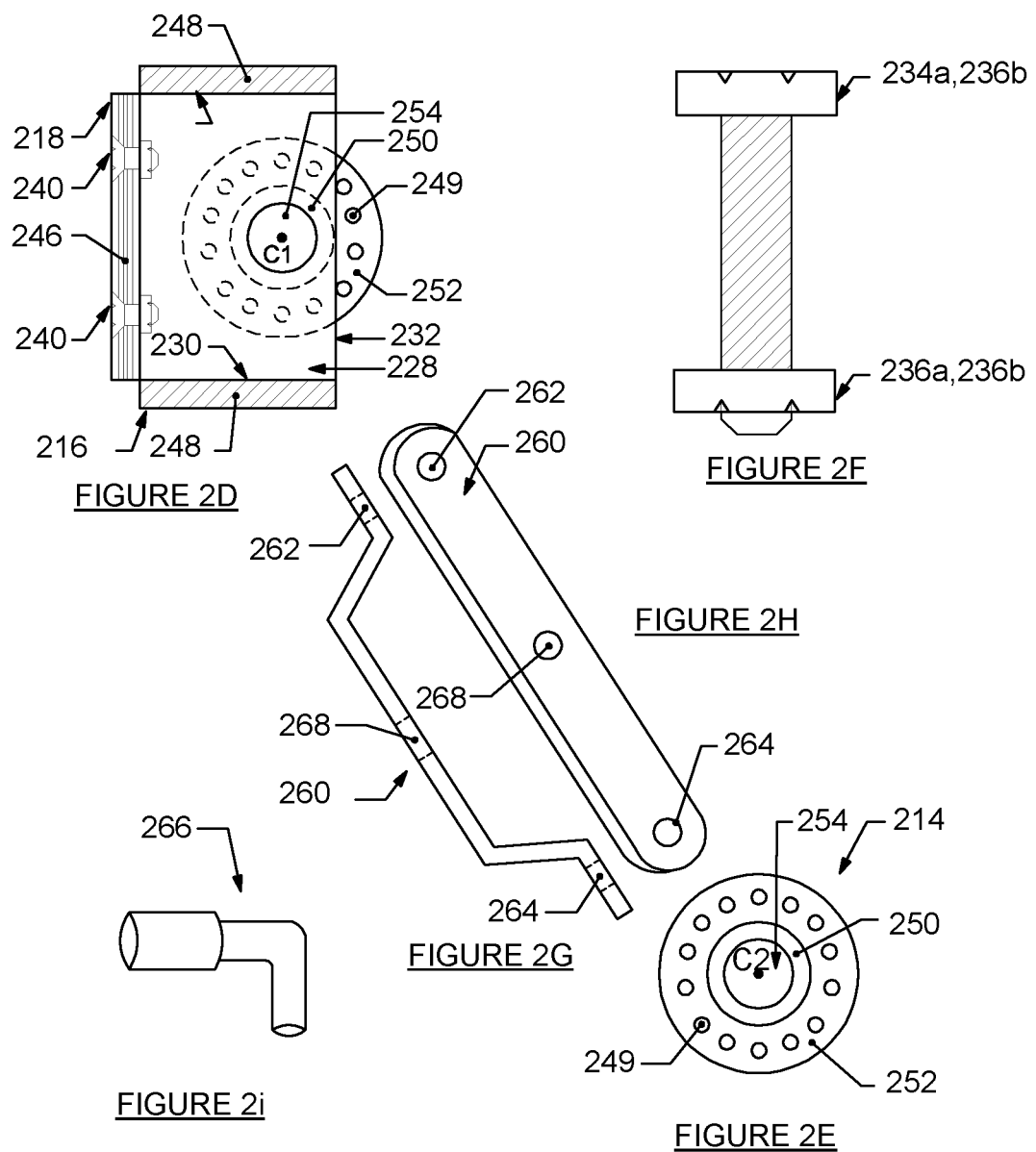

COLLISION BEARING

As a preliminary to any descriptions or drawings of the embodiments, a scientific explanation is set out below to define what a collision is, to assist in the understanding of the underlying principle upon which the invention, as described herein, is based.

According to known physical principles, every material particle in the universe possesses its own intersect function, S—Spinning or R—Rotating. The word spinning is used to describe this function in nuclear physics and the word rotating in classic physics. When the particle meets another particle or an object, that particle will continue to spin (rotate) and slide against the other particle or object, simultaneously, as well as losing mass, which is converted into energy.

In the physical universe everything is relative to the number of collisions, including time.

A graphic representation is shown in FIG. 1.1.

This Collision Bearing demonstrates that the combination of these two functions is the universal physical principle of Collision, hence the naming of the bearing as a "Collision Bearing" and thus, a basic machine in mechanics.

A simple example of the collision principle is the "nut and bolt".

The following two equations represent the Collision Principle:

$$C=R+S \qquad \text{Classic Physics}$$

$$QC=S1+S \qquad \text{Nuclear Physics}$$

Legend:
C—Collision
QC—Quanta of Collisions
R—Rotating
S1—Spinning
S—Sliding

Note: 1. The two above equations can be applied in all branches of science and technology.

Note: 11. In nuclear physics the degree of elasticity is directly proportional to the intensity of the electric field of the particle prior to the collision and inversely proportional to the number of collisions.
Nuclear Physics $$De=1/NC$$

Legend:
NC—Number (N) of Collisions (C)
De—Degree of Elasticity

Note: This Collision Principle proves, the degree of elasticity is always changing in the Universe as some mass is always converted into heat energy with each collision.

The present assumption of collision is: sometimes mass is lost sometimes not.

TECHNICAL FIELD

The completed assembly of the component parts of this present invention combines the two functions, rotation (spinning) and sliding which expresses this discovery of the universal physical principle of collision, thus the name Collision Bearing as a basic machine for various applications in mechanics.

Throughout this specification, unless the context requires otherwise, the word "comprise" and variations such as "comprises" and "comprising" are to be understood to imply the presence of a stated integer or group of integers but not the exclusion of any other integer or group of integers.

Throughout this specification, unless the context requires otherwise, the word "include" and variations such as "includes," including and included are to be understood to imply the presence of a stated integer or group of integers but not the exclusion of any other integer or group of integers.

BACKGROUND ART

The discussion of the background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification has been filed.

Australian patent application 71775/87 discloses a rolling cover system for transport vehicles. The rolling cover system disclosed in this patent application can be used to cover and uncover cargo carried on the load area of a transport vehicle such as, for example, a truck, trailer or rail car.

Whilst patent application 71775/87 discloses a rolling cover system for covering and uncovering a load area of a vehicle, the particular arrangement of the roller bearing and the foot (now referred to as the bearing support body), moving along the rails (now referred to as channels), as disclosed therein, will suffer from imbalance, increased resistance in the sliding operation due to the short sliding plate, thus reduced time efficiency, increased flexibility and instability problems when the hoops are moved over the load area of the vehicle.

SUMMARY OF INVENTION

The statement regarding the imbalance in the above patent has been resolved by the addition of a second roller bearing and an alternative embodiment.

In accordance with one aspect of the present invention, the Collision Bearing comprises:

At least two roller bearings,

A bearing support body,

At least one of the roller bearings is mounted in the bearing support body, for horizontal application: the two roller bearings are a) fixed within a bearing support body, and b) in specific applications, as a split unit, each within their own bearing support body, and minimally two are in use;

for vertical application: a) the upper roller bearing only, requires fixing within a bearing support body and is aligned forward of the lower roller bearing, as the lower bearing's function is for stability, alignment, and for sharing the distribution of the weight being moved. It needs no bearing support body when the upper and lower channels are united. b) when the application requires a reasonable distance between the upper and lower channel members, each bearing will require a bearing support body and a slide plate.

A slide plate, which must be an integral part of the bearing support body, is made of hard plastic, and is attached to the centre of the bearing support body, such that the slide plate, shaped like a rectangular capital H, is positioned at the base of the bearing support body and extends to provide sliding contact with the inside walls of the channel member, for horizontal application, and for vertical application, the slide plate is of a rectangular shape, but shorter, positioned on the top of the upper bearing support body and again extended beyond the width of the bearing support body to provide sliding contact with the inside walls of the channel member, resulting in smooth, stable motion of the Collision Bearing along the channel member in both applications;

a metal connector plate:

which is necessary in the vertical embodiment, to connect the upper and lower bearings, the length of which is relative to the height and weight of the object being moved, which, in turn, determines the angle of the vertical alignment of the two bearings, in order to equally distribute the weight carried.

a bent connector:

for the vertical embodiment, a bent connector arm is welded at the centre of the metal connector plate, to receive any attachment;

bushes/spacers:

are required on either side of the bearings and within the bearing support body, such that contact is made only with the non-moving centre of the bearing. The lower bearing requires the application of a spacer to centre its alignment with the upper bearing.

However, when the application requires separating the two channel members, the lower bearing must also have a bearing support body, slide plate and bush/spacer either side of the bearing and within the bearing support body. The aligning spacer will not be required.

channel means:

for horizontal embodiment, a single channel member whose side walls are of such a length as to guide the slide plate, and the web members retain the Collision Bearing, within the channel member, for vertical embodiment: the upper channel member whose web member on the open side is of such a length as to guide the slide plate, and retain the bearing within the channel member, and where the channel members are separated, the upper web member of the lower channel also needs to be of such a length as to guide the slide plate and retain the bearing within the lower channel.

Each Collision Bearing has an impact pad attached to each end of the roller bearing support body.

In use, the bearings roll along the base of the channel members and the slide plate, in sliding contact with the inner walls of the channel member, results in a stable, smooth and easy motion of the Collision Bearing along the channel members, in both the horizontal and vertical embodiments. The flange members retain the Collision Bearing within the channel member.

This is the physical expression of the universal physical principle of collision.

BRIEF DESCRIPTION OF DRAWINGS

The present invention will now be described, by way of example only, with reference to the accompanying drawings, in which:

FIG. 1.1 is a graphic representation of what happens when Particle A meets Particle B, or Object B;

FIG. 1I is a first plan of a prototype of a Collision Bearing, of the type shown in FIG. 1B, showing a portion of the channel member and two Collision Bearings.

FIG. 1J is a second plan view of one of the prototypes shown in FIG. 1I showing the portion of the channel member and with a Collision Bearing located outside the channel member.

FIG. 1K is a third plan view of the prototype shown in FIG. 1I showing the portion of the channel member and with the two Collision Bearings inverted and located outside the channel member

FIG. 2D is a partly cross sectional side view of the upper (first) bearing, the bearing support body, the slide plate and the impact pads, shown in FIG. 2A.

FIG. 2E is a partly cross sectional side view of the lower (second) bearing as shown in FIG. 2A.

FIG. 2F is a side view of the connecting plate which connects the upper (first) and lower (second) bearings shown in FIG. 2A.

FIG. 2G is a side view of one of the two nuts and bolt which secures the upper (first) and lower (second) bearings to the connecting plate, completing the assembly of the Collision Bearing.

FIG. 2H is a front view of the connecting plate, which connects the first and second bearings as shown in FIG. 2A.

FIG. 2I is a side view of the connector arm, which is attached, at the mid point, to the connecting plate, of the Collision Bearing, as shown in FIG. 2A.

DESCRIPTIONS OF EMBODIMENTS

First Embodiment

Figure 1A:
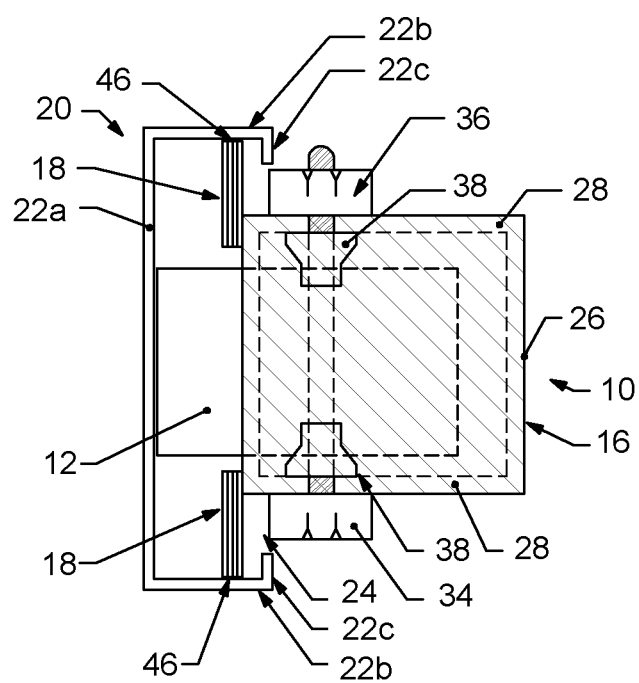
FIG. 1A is an end view of the first embodiment of the Collision Bearing, sitting in the channel member, in accordance with the present invention.

In FIG. 1A to 1H, there is shown a Collision Bearing and its various component parts. FIG. 1I is a photo of the prototype of two Collision Bearings and the channel member.

The Collision Bearing 10 comprises two roller bearings 12 and 14, a bearing support body 16, a slide plate 18, impact pads 48, and a channel member 20. The bearings 12 and 14 are mounted in the bearing support body 16. The bearings 12 and 14 are positioned in the channel member 20.

Figure 1B:
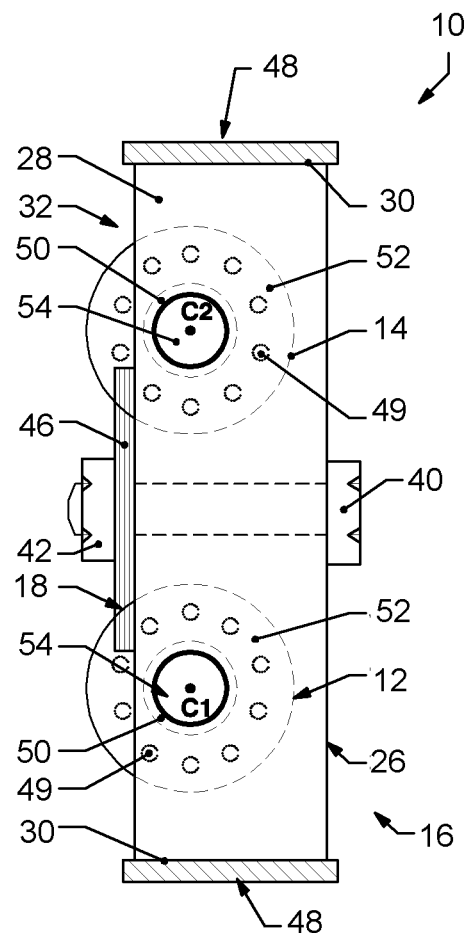
FIG. 1B is a cross sectional side view of the Collision Bearing, consisting of the two roller bearings, the bearing support body, a slide plate and the nut and bolt that connects the slide plate to the bearing support body, and the impact pads, shown in FIG. 1A.
Figure 1C:
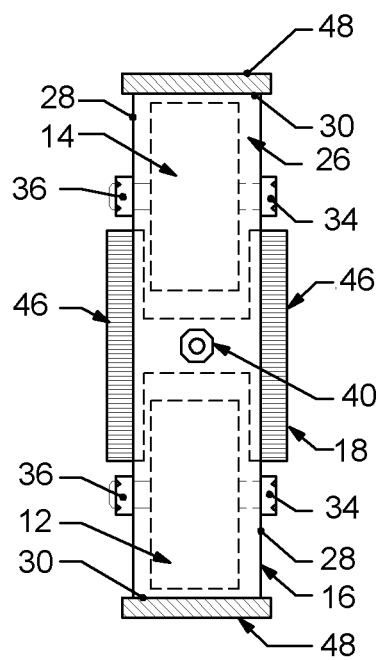
FIG. 1C is a top plan view of the Collision Bearing showing the two bearings, the bearing support body and the slide plate projecting beyond the side walls of the bearing support body shown in FIG. 1B.
Figure 1D:
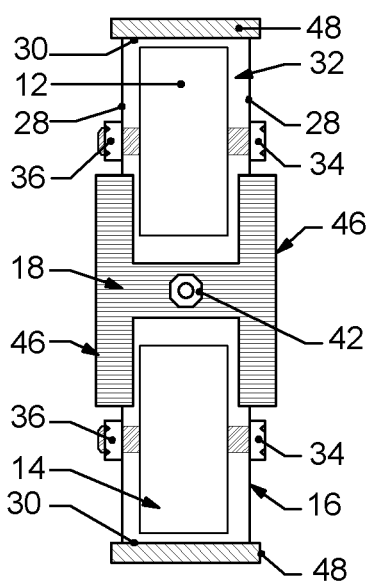
FIG. 1D is the bottom plan view of the Collision Bearing, showing why the H shape of the slide plate, not seen in FIG. 1B.
Figure 1E:
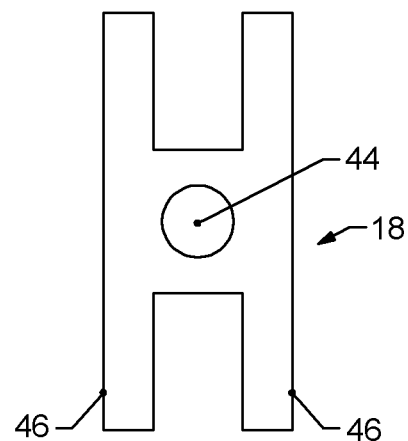
FIG. 1E is a top plan view of the slide plate of the Collision Bearing in the first embodiment shown in FIG. 1A
Figure 1F:
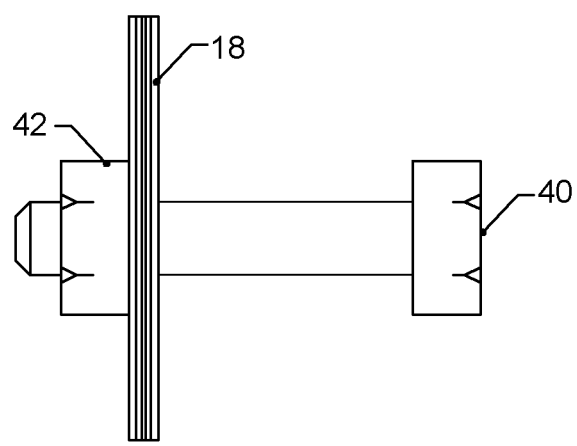
FIG. 1F is a side view of the slide plate and nut and bolt, which connects the slide plate to the bearing support body, of the Collision Bearing shown in FIG. 1A.
Figure 1G:
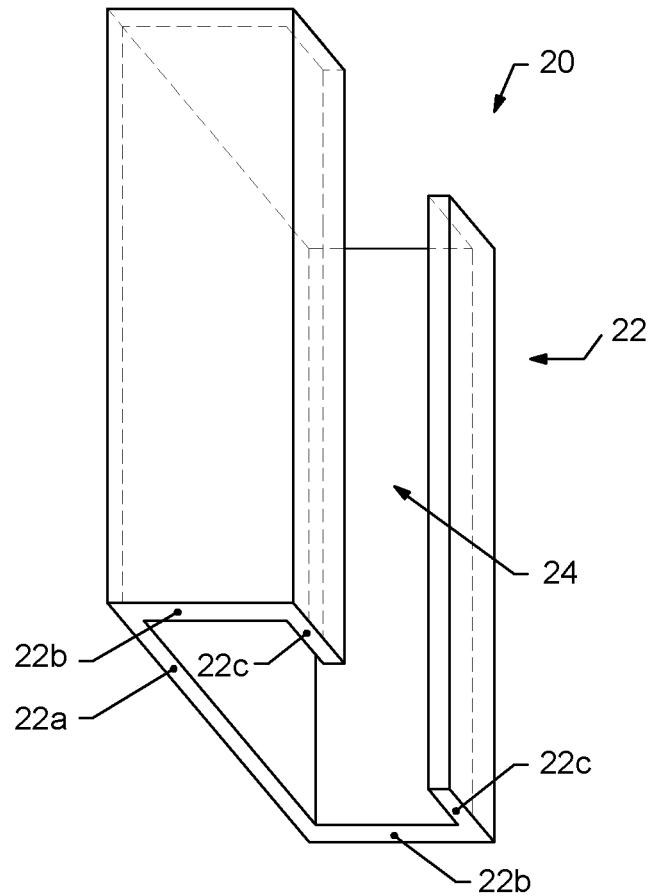
FIG. 1G is a perspective view of the channel member which guides the Collision Bearing shown in FIG. 1A.
Figure 1H:
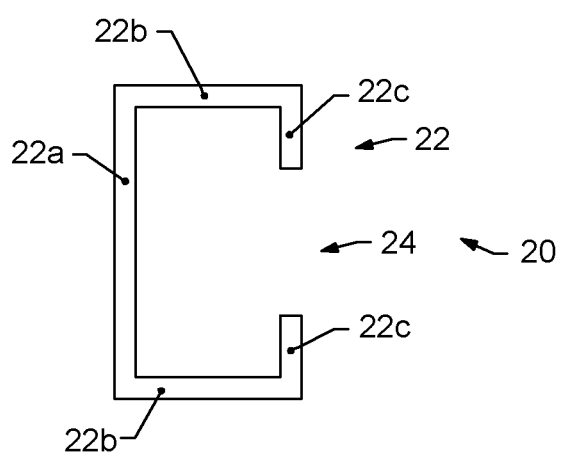
FIG. 1H is an end view of the channel member shown in FIG. 1G.

The channel member 20 is substantially U-shaped in profile, as is best seen in FIGS. 1A and 1H. The channel member 20 comprises walls 22. The walls 22 comprise a web member 22a and a respective side member 22b extending from each longitudinal edge of the web member 22a. There is a longitudinal opening 24 opposed to the web member 22a. In addition, a flange member 22c extends inwardly from the longitudinal edge of each side member 22b at the opening 24 which retains the Collision Bearing within the channel. The channel member 20 has a length that is suitable for the site at which the Collision Bearing 10 is to be used.

The bearing support body 16 comprises a first wall 26, a pair of side walls 28, extending from the side edges of the first wall 26, and a pair of end walls 30, extending from the end edges of the first wall 26. The bearing support body 16 is substantially in the form of a rectangular box with an opening 32 opposed to the first wall 26. The bearings 12 and 14 are located in the channel member 20 and extend partly out of the opening 32 as best seen in FIGS. 1A and 1B. The bearings 12 and 14 are in contact with the web member 22a inside the channel member 20, i.e. in contact with the inner surface of the web member 22a.

The two bearings 12 and 14 are mounted in the bearing support body 16 by a respective bolt 34 and secured in place by a respective nut 36. The bolts 34 pass through a respective bearing 12/14 and a pair of aligned bolt-holes in the side walls 28. A bush, or spacer, 38 must be provided between each side of each bearing 12 and 14 and the adjacent side walls 28, such that the bush, or spacer, is only in contact with the stationary centre of the respective bearing and the adjacent side walls 28 of the bearing support body 16.

In the drawings the bearing support body 16 is shown as having solid walls 26, 28, and 30. However, the bearing support body must have two aligned bolt-holes in the wall 28 and one aligned bolt-hole in the centre of the wall 26. The end walls 30 must be closed, either with a hard rubber/plastic impact pad or the impact pads are adhered to the solid walls 30.

The slide plate 18 is provided at the opening 32 of the bearing support body 16, as best seen in FIGS. 1B and 1D. The slide plate 18 is shown separately in FIG. 1E, from which it can be seen that the slide plate 18 is substantially H-shaped. This shape accommodates the bearings 12 and 14. The slide plate 18 must abut the edges of the side walls 28, of the bearing support body 16, at the opening 32.

The slide plate 18 is fixed to the bearing support body 16. A bolt 40, passing through a respective bolt-hole in the first wall 26 and the slide plate 18, with a nut 42 retained thereon and abutting the slide plate, fixes the slide plate 18 with the bearing support body 16. The bolt-hole 44 in the slide plate 18 can be seen in FIG. 1E. The bolt 40, nut 42 and slide plate 18 are shown separately in FIG. 1F.

The slide plate is dimensioned such that it extends beyond the side walls 28 of the bearing support body 16, with its opposed edges 46 in sliding contact with the internal surfaces of respective side members 22b of the channel member 20, i.e. inside the channel member 20. This is best seen in FIG. 1A.

Impact pads must be provided at the respective exterior surfaces of end walls 30, i.e. outside the bearing support body 16. The impact pads are to be made of hard rubber or a similar material.

Each bearing 12 and 14 is provided as a roller bearing and may be of conventional form. Balls 49 are arranged between an inner race 50 and an outer race 52, with a bore 54 located in the middle. A respective bolt 34 extends through the bore 54 of each bearing 12 and 14.

The bearings 12 and 14 are arranged such that they are spaced apart in the bearing support body 16 and the respective axes C1 and C2 of the bearings 12 and 14 are substantially parallel and, when the Collision Bearing is installed for use, the axes C1 and C2 are spaced substantially horizontally.

The bearing support body 16 with bearings 12 and 14 mounted therein and the slide plate 18 are, collectively, referred to herein as the Collision Bearing.

Second Embodiment

A second embodiment of a Collision Bearing 200 and its various parts is shown in FIGS. 2A to 2J. The Collision Bearing 200 comprises two bearings 212 and 214, a bearing support a body 216, a slide plate 218, a connector plate 260, a connector arm 266, two impact pads 248 and two channel members 220a and 220b.

The bearing 212 is mounted in the bearing support body 216. The bearings 212 and 214 are positioned in the channel members 220a and 220b, respectively.

Figure 2A:
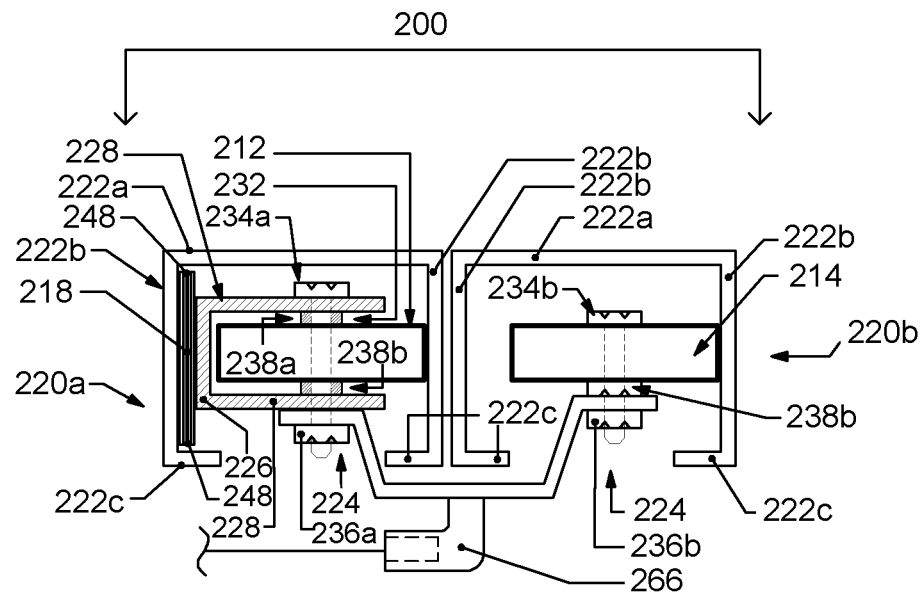
FIG. 2A is an end view of a second embodiment of a Collision Bearing in the channel members, in accordance with the present invention.
Figure 2B:
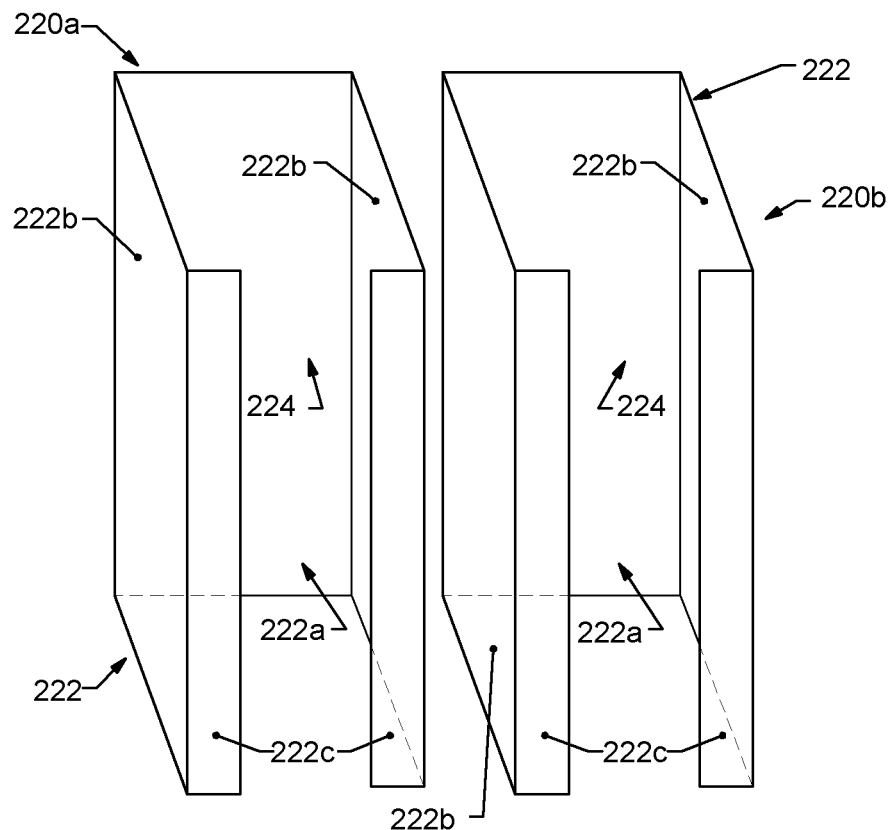
FIG. 2B is a perspective view showing the arrangement of the channel members which guide the Collision Bearing, as shown in FIG. 2A
Figure 2C:
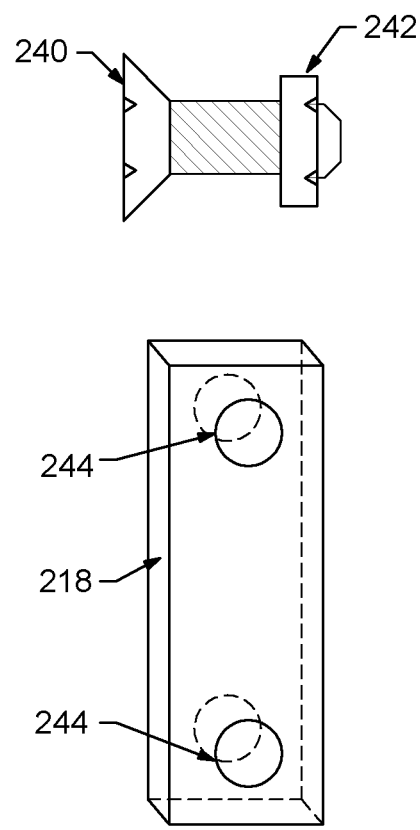
FIG. 2C shows the slide plate and the bolts (only one shown) that connects the slide plate to the bearing support body of the Collision Bearing as shown in FIG. 2A.

Each channel member 220a and 220b is substantially U-shaped in profile, as is best seen in FIGS. 2A and 2B. Each channel member 220a and 220b comprises walls 222. The walls 222 comprise a web member 222a and a respective side member 222b extending from each longitudinal edge of the web member 222a. There is a longitudinal opening 224 opposed to the web member 222a. In addition; a flange member 222c extends inwardly from the longitudinal edge of each side member 222b at the opening 224, the inner surface of which guides the upper bearing and retains it within the channel. The channel members 220a and 220b have a length that is suitable for the site at which the Collision Bearing 200 is to be used.

In use, the channel members 220a and 220b are arranged such that they are substantially parallel, with the channel member 220a located above the channel member 220b. The channel members 220a and 220b are arranged such that their respective openings 224 are provided on the same side, as best seen in FIG. 2A.

The bearing support body 216 comprises a first wall 226, a pair of side walls 228, extending from the side edges of the first wall 226, and a pair of end walls 230, extending from the end edges of the first wall 226. The bearing support body 216 is substantially in the form of a box with an opening 232 opposite to the first wall 226. The bearing 212 is located in the channel member 220a and extends partly out of the opening 232, as best seen in FIGS. 2A and 1D. The bearing 212 is in contact with a side member 222b inside the channel member 220a, i.e. in contact with the inner surface of that side member 222b of the channel member 220a.

The bearing 212 is mounted in the bearing support body 216 by a bolt 234a secured in place by a nut 236a. The bolt 234a passes through the bearing 212 and a pair of aligned bolt-holes in the side walls 228. A bush, or spacer 238a and 238b must be provided either side of the bearing 212 and within the adjacent side walls 228 of the bearing support body 216, such that only the stationary centre of the bearing is in contact with the bushes/spacers.

In the drawings, the bearing support body 216 is shown as having solid walls 226, 228 and 230. However the bearing support body 216 must have two aligned bolt-holes in the walls 228, and two bolt-holes, one either end of the wall 226, by which to affix the slide plate. The end walls 230 of the bearing support body must be closed, either with a hard rubber (or similar material) or the impact pads 248 are adhered to the end walls 230.

The slide plate 218 is provided at the first wall 226 of the bearing support body 216, as is best seen in FIGS. 2A and 2D. The slide plate 218 is shown separately in FIG. 2C from which it can be seen to be substantially rectangularly shaped.

The slide plate 218 is fixed to the bearing support body 216. In that regard, the slide plate 218 is provided with a pair of bolt-holes 244 that are aligned with a respective pair of bolt-holes in the first wall 226. A bolt 240 passes through each pair of the aligned bolt-holes in the slide plate 218 and the first wall 226. A nut 242 is retained on each bolt 240 and abuts the first wall 226 on the inside of the bearing support body, to thereby fix the slide plate to the bearing support body. Alternatively two screws, countersunk into the slide plate could be used to fix the slide plate by screwing into the bearing support body. The slide plate 218, the bolt 240 and the bolt-holes 244 are shown separately in FIG. 2C.

The slide plate is dimensioned such that it extends beyond the side walls 228 of the bearing support body 216, with its opposed edges 246 in sliding contact with the internal surfaces of the web member 222a and a flange member 222c of the channel member 220a, i.e. inside the channel member 220a. The top surface of the sliding plate 218 does not make contact with the wall 222b of the channel member. This is best seen in FIG. 2A.

Impact pads 248 must be provided at the respective exterior surfaces of the end walls 230, i.e. outside the bearing support body 216. The impact pads are to be made of hard rubber or a similar material.

Each bearing 212 and 214 is provided as a roller bearing and may be of conventional form. Balls 249 are arranged between an inner race 250 and an outer race 252, with a bore 254 located in the middle. The bolt 234a extends through the bore 254 of the bearing 212 and the bolt 234b extends through the bore 254 of the bearing 214.

A connector plate 260 extends between the bearing 212 and 214 such that the bearings 212 and 214 travel in unison in the channel members 220a and 220b, respectively. The connector plate 260 is shown separately in FIGS. 2G and 2H. The connector plate 260 is provided with bolt-holes 262 and 264 that are located near spaced ends of the connector plate 260. The bolt 234a extends through the bolt-hole 262 such that the region of the connector plate 260 around the bolt-hole 262 is sandwiched between the nut 236a on the bolt 234a and a side wall 228 of the bearing support body. A bush or spacer, 238a and 238b is required either side of the centre of bearing 212 and inside the bearing support body wall 228, such that in the process of "sandwiching" the connector plate 260, there is no distortion of the bearing support body wall 228, when tightening the nut 236a. The spacer or bush, 238a and 238b, only, contacting the stationary centre of the bearing 212. The nut 236b is positioned on the bolt 234b to retain the bearing 214 on the bolt 234b. The size of the head of the nut 236b is governed by the non moving inner race 250. The region of the connector plate 260 around the bolt-hole 264 is sandwiched between the nut 236b on the bolt 234b and a bush, or spacer 238c positioned adjacent to the bearing 214. The bush or spacer 238c, only, contacting the stationary centre of the bearing 214.

The bearing 214 is in contact with a side member 222b inside the channel member 220b, i.e. in contact with the inner surface of that side member 222b of the channel member.

The bearing support body 216 with the impact pads 248 attached and the bearing 212 mounted therein, the attached slide plate 218, the bearing 214 and the connector plate 260 mounted with the bearings 212 and 214 is the completed Collision Bearing.

A connector arm 266 extends from the connector plate 260 from the mid-region 268 between the ends of the connector plate. The mid-region 268 and the respective axes C1 and C2, of the bearings 212 and 214, are substantially aligned in the same plane. The connector arm 266 is shown separately in FIG. 2I.

Figure 2J:
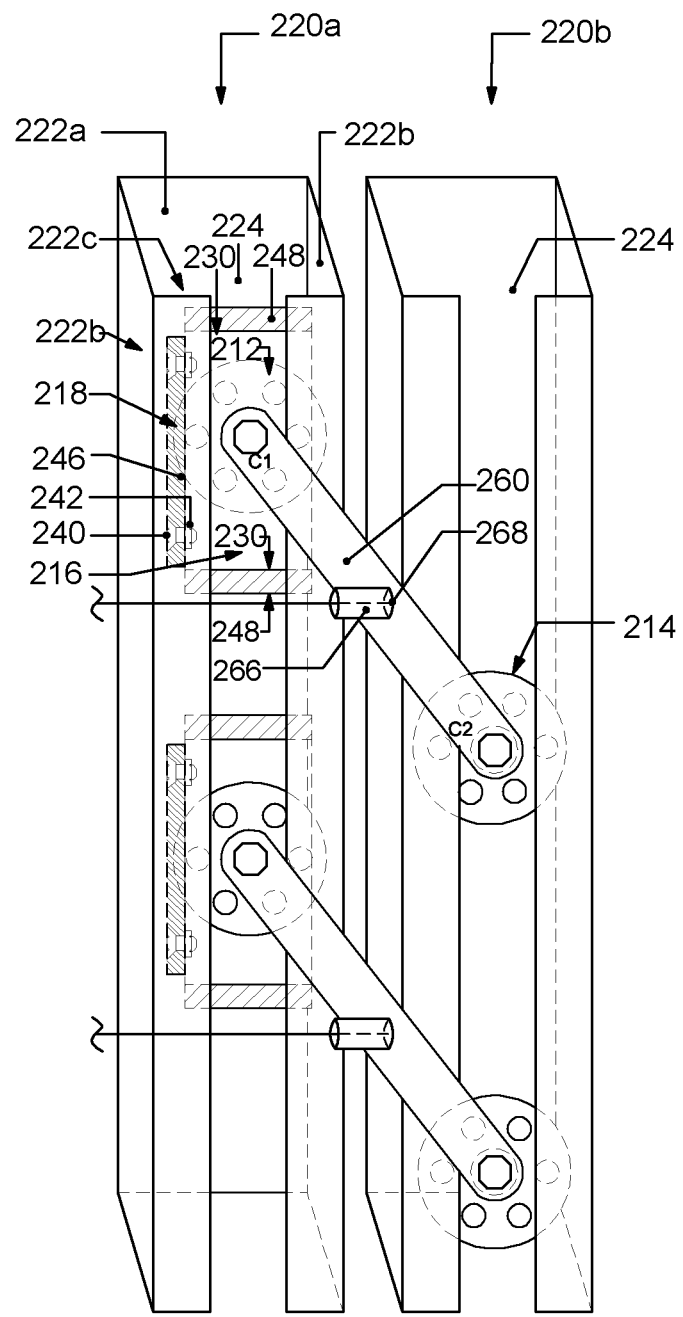
FIG. 2J is a perspective view of the channel members and two Collision Bearings, one of which is shown in FIG. 2A.

The bearings 212 and 214 are arranged such that they are spaced apart and the respective axes C1 and C2 of the bearings 212 and 214 are substantially parallel and, when the Collision Bearing 200 is installed at the site for use, the axes are spaced substantially vertically, as is shown in FIG. 2J.

Operation and Use of the Invention

The operation and use of the Collision Bearing will now be described.

The first embodiment of the Collision Bearing invention may be used in any suitable situations, i.e. to move sliding doors, windows, dividing panels, shower screens, gates, etc. The second embodiment is best applied to rolling cover systems for all sized open vehicles, hangars for aircraft, maintenance covers at mining and industrial sites, shelters, farming applications, horticultural and agricultural cover systems, aerospace applications and in the electronics/robotics industries. The Collision Bearings 10 and 200 are able to travel along the channel member 20 and the channel members 220a and 220b, respectively, in a rolling (or rotating) and sliding manner simultaneously. This results in smooth and stable motion of the Collision Bearing along the channel members. In the first embodiment of the Collision Bearing, the two bearings 12 and 14 travel along the web member 22a of the channel member 20 in a rolling (or rotating) manner and the slide plate 18 slides along the inner surfaces of the two side members 22b in the channel member 20

In the second embodiment of the Collision Bearing, the upper bearing 212 travels along the side member 222b of the channel member 220a in a rolling (or rotating) manner and the slide plate 218 slides along the inner surfaces of the flange member 222c and the side member 222a. The lower bearing 214 travels along the side member 222b of the channel member 220b in a rolling (or rotating) manner.

In use, the combination of the two functions within the Collision Bearing 10 and 200 provides the smooth, balanced and stable travel of the Collision Bearing within the channel members, channel member 20 and channel members 220a and 220b, which are retained within the channel by the flange members 22c and 222c. A suitable number of Collision Bearings are placed in the channel members for the particular intended use. The impact pads greatly reduce any damage to the bearing support body of the Collision Bearing.

In use, the Collision Bearings 10 and 200 are inserted into the respective channel members 20 and, 220a and 220b, which guide their motion for the designated use.

Whilst preferred embodiments of the present invention have been before described, the scope of the present invention is not limited to those specific embodiments, and may be embodied in other ways, as will be apparent to a skilled addressee.

Modifications and variations such as would be apparent to a skilled addressee are deemed to be within the scope of the present invention.

I claim:

1. A weight carrying bearing comprising:
   at least two roller bearings mounted to a bearing support body for receiving a weight,
   a slide plate fixed to the bearing support body so as to be substantially parallel with an axis of rotation of at least one of the roller bearings, and at least one elongate channel for transferring the weight to another body,
   wherein the at least one of the roller bearings and the slide plate are within the channel such that the bearing transfers weight to a wall of the channel and opposite sides of the slide plate are in sliding contact with walls of the channel so as to maintain the transverse position of the roller bearing in the channel, and the at least one of the roller bearings and the slide plate are movable along the length of the channel.

2. The weight carrying bearing according to claim 1, wherein a second one of the roller bearings is within the channel such that the second roller bearing transfers weight to the same wall of the channel as the first roller bearing.

3. The weight carrying bearing according to claim 2, further comprising impact pads on longitudinal ends of the bearing support body for impact on ends of the channel.

4. The weight carrying bearing according to claim 2, wherein the axis of rotation of the roller bearings are parallel to each other.

5. The weight carrying bearing according to claim 4, further comprising impact pads on longitudinal ends of the bearing support for impact on ends of the channel.

6. The weight carrying bearing according to claim 1, wherein the axis of rotation of the roller bearings are parallel to each other.

7. The weight carrying bearing according to claim 6, further comprising impact pads on longitudinal ends of the bearing support body for impact on ends of the first channel.

8. The weight carrying bearing according to claim 1, further comprising impact pads on longitudinal ends of the bearing support body for impact on ends of the channel.

9. The weight carrying bearing according to claim 1, wherein the at least one elongate channel comprises a first channel and a second channel.

10. The weight carrying bearing according to claim 9, a second one of the roller bearings is within the second channel such that the second one of the bearings transfers weight to a wall of the second channel.

11. The weight carrying bearing according to claim 10, wherein the second channel is vertically positioned in relation to the first channel.

12. The weight carrying bearing according to claim 11, further comprising impact pads on longitudinal ends of the bearing support body for impact on ends of the first channel.

13. The weight carrying bearing according to claim 11, wherein the axis of rotation of the roller bearings are parallel to each other.

14. The weight carrying bearing according to claim 13, further comprising impact pads on longitudinal ends of the bearing support body for impact on ends of the first channel.

15. The weight carrying bearing according to claim 10, further comprising impact pads on longitudinal ends of the bearing support body for impact on ends of the first channel.

16. The weight carrying bearing according to claim 10, wherein the axis of rotation of the roller bearings are parallel to each other.

17. The weight carrying bearing according to claim 16, further comprising impact pads on longitudinal ends of the bearing support body for impact on ends of the first channel.

* * * * *